May 23, 1933.   B. M. ORCUTT   1,911,035
SHOOTING TRAP CONTROL APPARATUS
Filed March 14, 1931
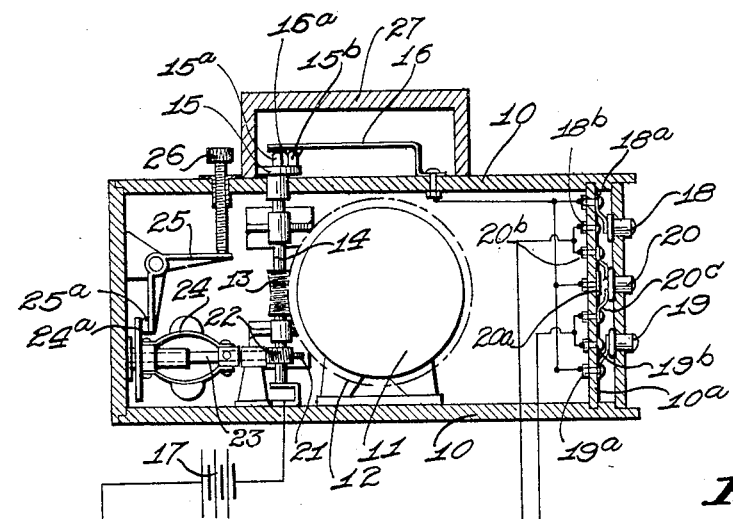
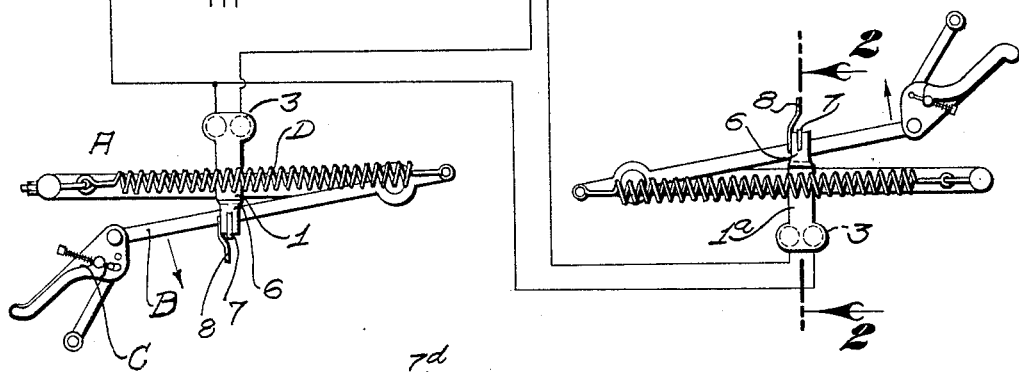
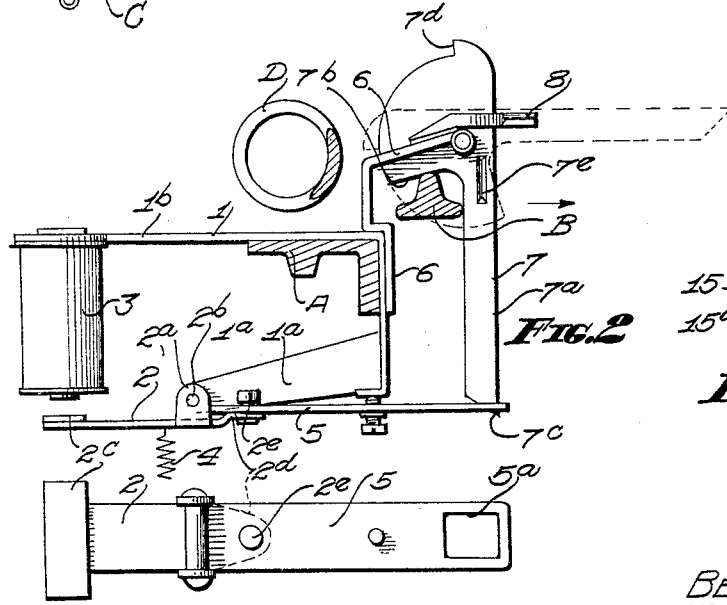
INVENTOR
BENJAMAN M. ORCUTT
BY
A. B. Bowman
ATTORNEY Patented May 23, 1933

1,911,035

UNITED STATES PATENT OFFICE

BENJAMAN M. ORCUTT, OF LA MESA, CALIFORNIA

SHOOTING TRAP CONTROL APPARATUS

Application filed March 14, 1931. Serial No. 522,557.

My invention relates to a shooting trap control apparatus and the objects of my invention are:

First, to provide an apparatus of this class which adds the uncertain time element to the sport of trap shooting that exists under actual hunting conditions;

Second, to provide a control apparatus of this class which is particularly adapted for a trap shooting contest as it is impossible to cheat by arranging with the person operating the traps or throwing devices to operate them at a predetermined interval after the call for operation is given;

Third, to provide an apparatus of this class which will actuate either one or both of the shooting traps as desired;

Fourth, to provide an apparatus of this class which operates electrically thereby insuring uniform operation of the shooting trap;

Fifth, to provide a novelly constructed trap release mechanism designed to operate by remote control and which automatically resets itself as well as locks when the arm of the shooting trap is brought back in position for its next throwing movement; and Sixth, to provide on the whole a novelly constructed shooting trap control apparatus which is simple of construction proportional to its functions, durable in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a diagrammatical view of my shooting trap control apparatus showing the relationship of the various elements and the essential elements of the traps or throwing devices; Fig. 2 is an enlarged transverse sectional view through 2—2 of Fig. 1 showing in detail the construction of the trap release mechanism; Fig. 3 is a plan view of the tripping lever means; and Fig. 4 is a fragmentary elevational view of the periodically actuated switch members 15 and 16.

Similar characters of reference refer to similar parts and portions throughout the several views of the drawing.

Support 1, actuating lever 2, magnet coils 3, spring 4, trip lever 5, support 6, locking bar 7, catch spring 8, casing 10, motor 11, drive gear 12, worm 13, shaft 14, contact disk 15, contact member 16, battery 17, single pole switches 18 and 19, double pole switch 20, gear 21, worm 22, governor shaft 23, governor 24, governor control lever 25, set screw 26, and cover 27 constitute the principal parts and portions of my novel shooting trap control mechanism.

The release mechanism of my apparatus fits on each trap or throwing device used to throw the clay pigeons in the sport of trap shooting, preferably in place of the conventional catch mechanism used to hold the trap throwing arm. In the several views, the parts of the shooting trap essential to the operation of my apparatus comprises a frame member A at one end of which is pivotally mounted a throwing arm B. This arm is provided with mechanism C for holding a clay pigeon. The throwing arm is actuated by a spring D attached at one end to a short extension of the throwing arm and by its other end to the frame A.

My release mechanism includes a support 1 which is suitably supported upon the frame A. The support 1 is provided with a bracket portion 1a which extends underneath and transversely with the frame A. The extended end of the bracket 1a supports an actuating lever 2. The lever 2 is provided with upwardly turned lugs 2a which receive a pin 2b supported by the extremity of the bracket 1a.

The outwardly extending or longer arm of the actuating lever 2 is provided with a cross bar 2c at its extremity formed of iron or the like so as to be attracted to the core or armature of a solenoid coil. The support 1 also includes an arm 1b which extends outwardly from the upper portion of the frame A into overhanging relation with the aforementioned arm of the lever 2. Arm 1b supports depending solenoid coils forming an electro-magnet 3 which terminates in proper operative relation with the cross bar 2c of the lever 2. The bar 2c is normally held away from the electro-magnet 3 by means of a spring 4.

Hinged by one end to the pin 2b, is a trip lever 5 which extends in the opposite direction from the bracket 1a and beyond the margin of the frame A. The actuating lever 2 is provided with a short arm 2d which extends underneath the trip lever 5 and is provided with an upwardly extending pin member 2e which projects through a hole in the trip lever 5 and is provided with a head so that a loose connection is formed between the two levers. Thus, the actuating lever 2 moves a short distance before it actuates the trip lever 5.

A second support 6 is secured to the frame 1. This support extends upwardly and outwardly from the frame A in the opposite direction from the arm 1b of the support 1 and rotatably supports at its extended end a locking bar 7. The locking bar comprises an arm portion 7a which is increased in width adjacent its side of rotation so as to form a shoulder 7b at the side thereof towards the frame A. The shoulder 7b extends across the top of the throwing arm B of the shooting trap while the arm 7a normally extends downwardly and is engaged by the side margin of the throwing arm shown best in Fig. 2. The throwing arm B tends to swing outwardly against the arm 7a by reason of the action of the spring D. The lower end of the arm 7a is beveled as indicated by 7c and is adapted to fit in a slot 5a provided in the trip lever 5. The trip lever thus holds the locking bar 7 from rotating by action of the throwing arm B against the arm 7a.

The locking bar 7 is provided with a suitable stop means 7d which limits the rotation thereof, to substantially that of the dotted line position shown in Fig. 2. In order to eliminate possibility of the arm 7a dropping to a vertical position when the throwing arm B is in its extended or operated position, there is provided a small leaf catch spring 8 which is provided with a ridge portion adapted to fit in a slight channel 7e formed in the arm 7a as shown in Fig. 2. The ridge of the spring 8 registers with the channel 7e when the locking bar is in the dotted position shown in Fig. 2.

Operation of the release mechanism is as follows:

Upon energizing of the magnet coils, the bar 2c of the actuating lever 2 is moved upwardly causing a downward jerk on the trip lever 5 thereby releasing the end 7c of the arm 7a, whereupon the locking bar rotates counterclockwise to the dotted line position shown in Fig. 2 by action of the throwing arm 7, as this arm moves in a direction of the arrows as shown in Figs. 1 and 2. Upon return movement of the throwing arm (which is accomplished by the operator), the arm B engages the shoulder 7b which acts as a cam to rotate the locking bar clockwise so that the beveled end 7b thereof is shifted over the extremity of the tripping lever 5 and into the slot 5a, thereupon the relief mechanism is set for the next throwing operation of the trap.

It is the usual practice at trap shooting grounds, to have two throwing traps arranged in spaced relation so as to throw clay pigeons toward approximately a common point. It is desired in such cases to arrange these traps so that either one of them may operate singly or both of them may operate simultaneously. This is accomplished by the control mechanism shown substantially diagrammatically in Fig. 1. The control portion of my apparatus comprises a casing 10. Within the casing there is provided a motor 11 such as a spring motor or an electrical motor as desired, which actuates a driving gear 12. This gear in turn drives a worm 13 mounted on a vertical shaft 14 which extends upwardly through the top of the casing 10 and is provided with a contact disk 15.

The contact disk 15 is provided with a centrally positioned pin 15a and an eccentrically located contact pin 15b. A contact member 16 is mounted on the top of the casing 10. This contact member is preferably in the form of a leaf spring which extends over the contacting member 15. The extended end of the contact member is insulated and rests upon the concentric pin 15a. Adjacent this extremity, the contact member 16 is provided with a depressed portion 16a which is adapted to be engaged by the contact pin 15b once upon each rotation of the shaft 14.

The shaft 14 is connected through a contact means 14a with one terminal of a battery 17, the other terminal of which is connected with magnet coils 3 of the two shooting traps.

Mounted upon a panel 10a forming a part of the casing 10 are single pole switches 18 and 19. Between these switches is a double pole switch 20. The contact member 16 is connected to one terminal of each single pole switch 18 and 19 and to the double contact terminal of the double pole switch 20. These terminals are designated 18a, 19a, and 20a respectively.

The remaining terminal 18b of the single pole switch 18 and one of the contacts designated 20c, of the double pole switch 20 is connected to the magnet coil 3, of one of the throwing traps. In a similar manner the remaining terminal 19b of the switch 19 and the remaining contact terminal 20c of the double pole switch 20 are connected to the solenoid 3 of the other throwing trap. Thus, the switch 18 operates one shooting trap switch 19, switch 19 operates the other shooting trap and switch 20 operates both traps simultaneously.

It is desired to control the speed of rotation of the shaft 14. This is accomplished by a suitable governor mechanism driven by a gear 21 mounted on the shaft 14 which engages a worm 22 on the governor shaft, designated 23. A governor 24, is mounted on this shaft and includes a friction disk 24a adapted to engage a brake shoe portion 25a of a lever 25 upon axial shifting of the disk due to the action of the governor. The position of the lever is regulated by a set screw 26 which extends through the casing 10.

For the purpose of adjustment, the contact disk 15 and contact member 16 are covered by a removable cover 27.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a shooting trap control apparatus, the combination with a pair of shooting traps and release mechanisms therefor, of a control means for said release mechanisms including, an independent switch for the release mechanism of each trap, a switch means for simultaneously operating both of said release mechanisms, an automatic switch mechanism in series with said switches and switch means and said release mechanisms, said automatic switch mechanism being periodically closed whereby upon operation of said switch or switch means, actuating of said release mechanism is delayed until the succeeding period of operation of said automatic switch mechanism, and means for controlling the magnitude of the periods between operation of said automatic switch mechanism.

2. In a shooting trap control apparatus, the combination with a shooting trap and a release mechanism therefor, of a control means for said release mechanism, including, a manual control mechanism an automatic control mechanism arranged to operate periodically said control mechanisms being so related with said release mechanism that both of said control mechanisms must be simultaneously operated to effect an action of said release mechanism, whereby upon operation of said manual control mechanism, actuation of said release mechanism is delayed until the succeeding period of operation of said automatic control mechanism, and means for controlling the magnitude of the intervals between operations of said automatic control mechanism.

3. In a shooting trap control apparatus, the combination with a shooting trap and a release mechanism therefor of an electrical control means for said release mechanism, including a manually operated switch, and an automatic periodically operated switch in series with each other and said release mechanism, whereby upon operation of said manual switch, the action of said release mechanism is delayed until the succeeding period of operation of said automatic switch, and means for regulating the magnitude of the intervals between operations of said automic switch mechanism.

4. In a shooting trap control apparatus, the combination with a shooting trap of a release mechanism including a locking bar normally yieldable to the throwing action of said shooting trap, a trip lever engaging and restraining said locking bar, an actuating lever arranged to actuate said trip lever, there being a loose connection between said levers whereby said actuating lever jerks said trip lever free of said bar, and eletromagnet means arranged to cause movement of said actuating lever.

5. In a shooting trap control apparatus, the combination with a shooting trap of a release mechanism including a locking bar normally yieldable to the throwing action of said shooting trap, a trip lever engaging and restraining said locking bar, an actuating lever arranged to actuate said trip lever, there being a loose connection between said levers whereby said actuating lever jerks said trip lever free of said bar, electromagnet means arranged to cause movement of said actuating lever, and a control mechanism for said electromagnet means including a manually operated switch and an automatic, periodically operated switch in series with each other and said electromagnet means, whereby upon closing of said manual switch, the action of said electromagnet means is delayed until the succeeding period of operation of said automatic switch.

6. In a shooting trap control apparatus, the combination with a shooting trap of a release mechanism including a locking bar normally yieldable to the throwing action of said shooting trap, a trip lever engaging and restraining said locking bar, an actuating lever arranged to actuate said trip lever, there being a loose connection between said levers whereby said actuating lever jerks said trip lever free of said bar, electromagnet means arranged to cause movement of said actuating lever, a control mechanism for said electromagnet means including a manually operated switch and an automatic, periodically operated switch in series with each other and said electromagnet means, whereby upon closing of said manual switch, the action of said electromagnet means is delayed until the succeeding period of operation of said automatic switch, and means for controlling the magnitude of the intervals between operations of said automatic switch.

In testimony whereof, I have hereunto set my hand at San Diego, California this 6th day of March, 1931.

BENJAMAN M. ORCUTT.